United States Patent [19]

Flint

[11] Patent Number: 5,782,068
[45] Date of Patent: Jul. 21, 1998

[54] HORSE MANE UNBRAIDER

[76] Inventor: Karin W. Flint, 1411 Kirkway Rd., Bloomfield Hills, Mich. 48302

[21] Appl. No.: 643,446

[22] Filed: May 8, 1996

[51] Int. Cl.$^6$ .................................................. B68B 5/00
[52] U.S. Cl. .................................................. 54/1; 132/200
[58] Field of Search ........................... 54/1, 78; 132/200; 30/317, 353, 356; 606/170; 7/161

[56] References Cited

U.S. PATENT DOCUMENTS

| | | | |
|---|---|---|---|
| 419,271 | 1/1890 | Low | 7/161 X |
| 4,709,481 | 12/1987 | Moore | 30/356 |
| 5,086,612 | 2/1992 | Anderson | 54/78 |
| 5,122,152 | 6/1992 | Mull | 606/170 |
| 5,397,333 | 3/1995 | Knoepfler | 606/170 |

*Primary Examiner*—Robert P. Swiatek
*Attorney, Agent, or Firm*—John A. Artz

[57] ABSTRACT

A tool for unbraiding a horse mane including a handle for easy gripping, a shank that extends from the handle, and a hook-shaped portion that includes a blade on its inner side for cutting the yarn that secures the braids in the horse mane. The configuration of the hook-shaped portion allows a user to cut the yarn by simply pulling the tool in a downward motion.

1 Claim, 2 Drawing Sheets

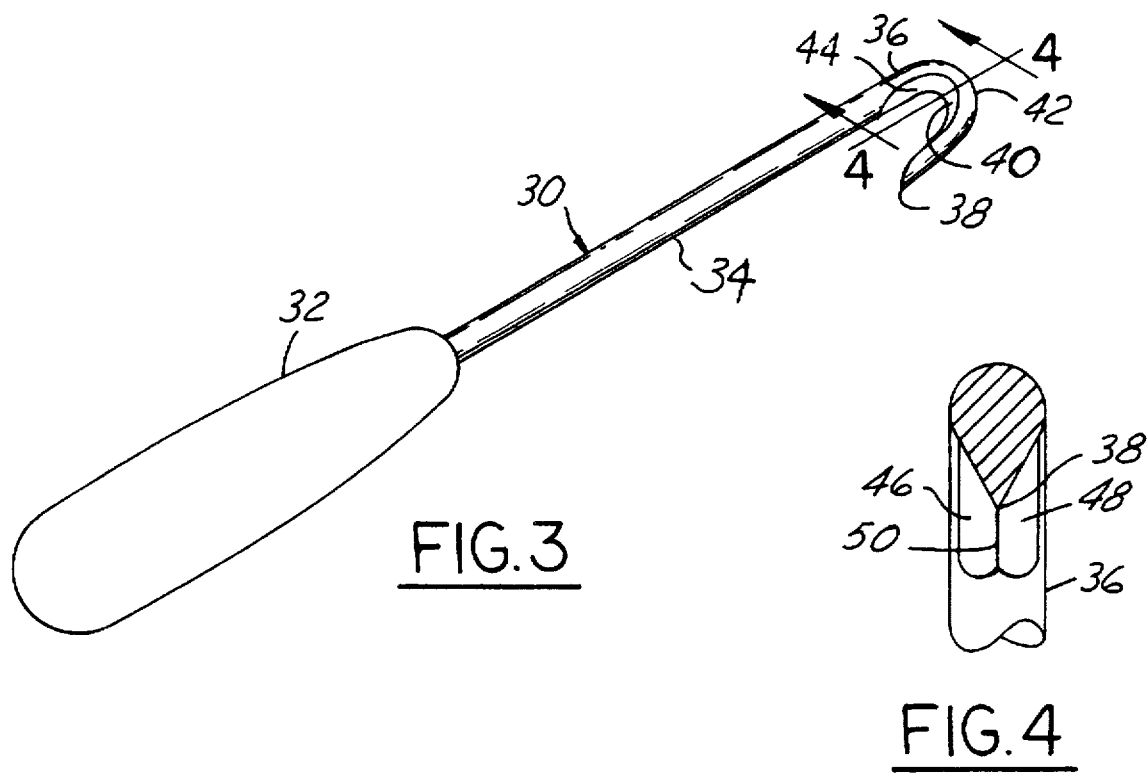
FIG. 3
FIG. 4
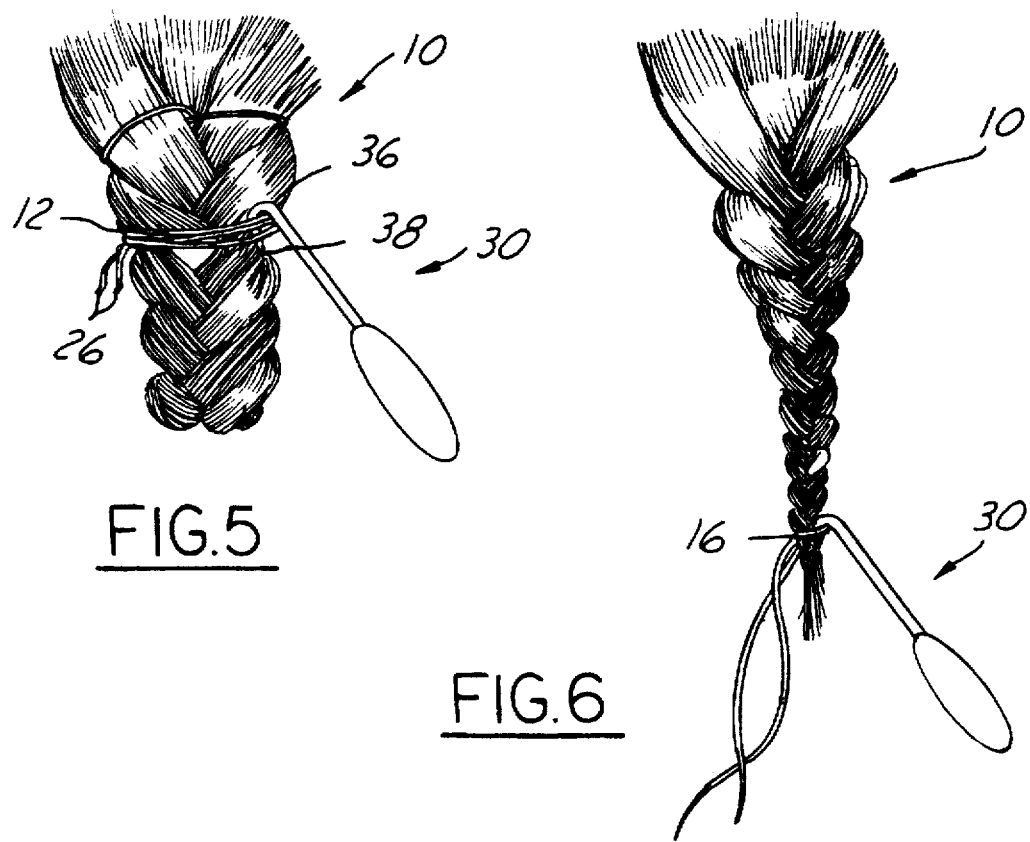
FIG. 5
FIG. 6

HORSE MANE UNBRAIDER

TECHNICAL FIELD

The present invention relates to a method and apparatus for removing braids from horse manes. More specifically, the present invention relates to an improved method and apparatus for cutting pieces of yarn that are used to secure individual braids in a horse's mane and thus allow for easy unbraiding of the horse's mane.

BACKGROUND ART

Horse mane braiding is a practice utilized by horse owners to keep the mane looking neat for horse shows, equestrian events or other events where the horse is on display. While aesthetically attractive, a braided horse mane is irritating to the horse. The irritation is severe enough that, if the mane is left braided for too long a period of time, a horse may try to scratch the braided area by rubbing the area against a wall in their stall or other surface, thereby injuring itself. Therefore, the braids must be removed from the mane after each event or at the very least at the end of each day. The braids are removed by cutting the knots of yarn that secure the individual braids. After the yarn is cut, it can be pulled out of the mane by hand or alternatively, the yarn can be soaked with water such that it will fall out without additional manipulation.

Various prior art methods and apparatus have been used to remove the braids from a horse's mane. For example, a prior device called a seam ripper is well known in the art. This prior seam ripper has a handle allowing a user to grasp the tool and two metal protrusions that form a "v" or valley along the center line of the tool. This valley is sharp and is designed to receive and cut the knots of yarn that secure the braids. Because of the tool's configuration, the user has to push the tool against the yarn that rests in the valley in order to rip it.

Further, because of the typical height of a horse, it is difficult initially to position the prior seam ripper inbetween the knot of yarn and the mane. Additionally, once this prior device is positioned between the knot and the mane, it is difficult to provide the necessary leverage to cut the knots. Accordingly, the use of this apparatus was extremely time consuming, tiring, and cumbersome. Moreover, the seam ripper was disadvantageous because it often damaged some of the mane while the knots were being cut.

SUMMARY OF THE INVENTION

It is an object of the present invention to provide a method and apparatus for unbraiding a horse's mane that is less cumbersome, less time-consuming, and also less damaging to the horse's mane than the prior art devices.

In accordance with the objects of the present invention, a tool for unbraiding a horse mane by cutting the yarn that secures the braids is provided. The tool comprises a handle connected to a metal shank having a hook-shaped portion located near the end of the metal shank. The hook-shaped portion has an inner surface and an outer surface and terminates in a point for easy insertion between the horse mane and the yarn. The inner surface of the hook-shaped portion is sharpened or machined to a thin ridge and acts as a cutting blade for cutting the yarn that is used to secure the braids.

A method for removing braids from a horse's mane which accomplishes the objects of the present invention is also disclosed and described. A horse's mane is typically braided by twisting the mane, doubling it over, and tying it up with a piece of yarn. The braid is secured with at least two knots in the yarn. In order to undo the braids, a tool with a sharpened edge is provided for cutting the knots to unravel the braids by first hooking the tool around one knot such that a portion of the outer surface of the hook-shaped portion is located between the mane and the yarn and such that the sharpened edge is facing the yarn of that knot. The tool is then pulled in a downward motion to cut the knot. The tool is then placed around the other knot such that the sharpened edge of the tool is facing the yarn of that knot and then the tool is pulled again in a downward motion to cut the other knot, thus releasing the mane from the braids.

Additional features and advantages of the present invention will become apparent to one of skilled in the art upon consideration of the following detailed description of the present invention.

DESCRIPTION OF THE DRAWINGS

A preferred embodiment of the present invention is described by reference to the following drawings:

FIG. 2-B is an illustration of a braid being doubled-over with the yarn being pulled through the mane to secure the braid in place in accordance with a preferred embodiment of the present invention;

FIG. 2-C is an illustration of a piece of yarn that is wrapped around a doubled-over mane braid in accordance with a preferred embodiment of the present invention;

FIG. 2-D is an illustration of a piece of yarn that is tied on one side of a doubled-over braid to secure the braid in accordance with a preferred embodiment of the present invention;

FIG. 2-E is an illustration of a finished braid in accordance with a preferred embodiment of the present invention;

FIG. 3 is an perspective view of an improved horse mane unbraiding tool in accordance with a preferred embodiment of the present invention;

FIG. 4 is a cross-sectional view of the cutting portion of the horse mane unbraiding tool, illustrated in FIG. 3, the cross-section being taken along the line 4—4;

FIG. 5 is an illustration of the improved horse mane unbraiding tool positioned to cut one knot holding a braid in accordance with a preferred embodiment of the present invention; and FIG. 6 is an illustration of the improved horse mane unbraiding tool positioned to cut a second knot of yarn at the end portion of the braid in accordance with a preferred embodiment of the present invention.

DESCRIPTION OF THE PREFERRED EMBODIMENTS

Figure 1:
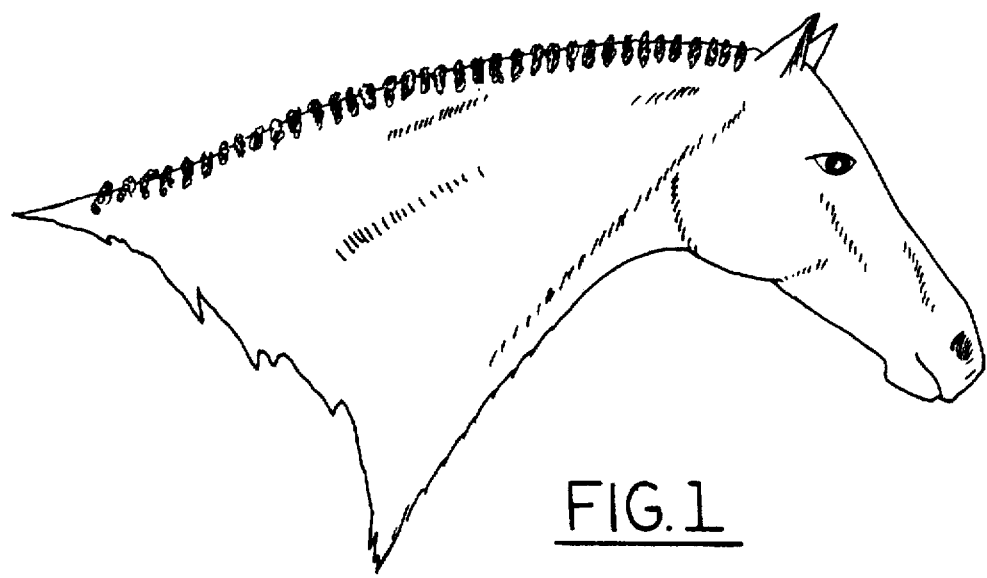
FIG. 1 is a side view of a horse's head and neck illustrating a braided horse mane.

Referring to FIG. 1, a braided horse mane is illustrated. Various types of braiding techniques are known and utilized, including knob style braids and basic flat braids. In the preferred embodiment of the present invention, basic flat braiding is illustrated, however the method and apparatus of the present invention can be utilized with any braiding technique.

Figures 2A, 2B, 2C, 2D, 2E:
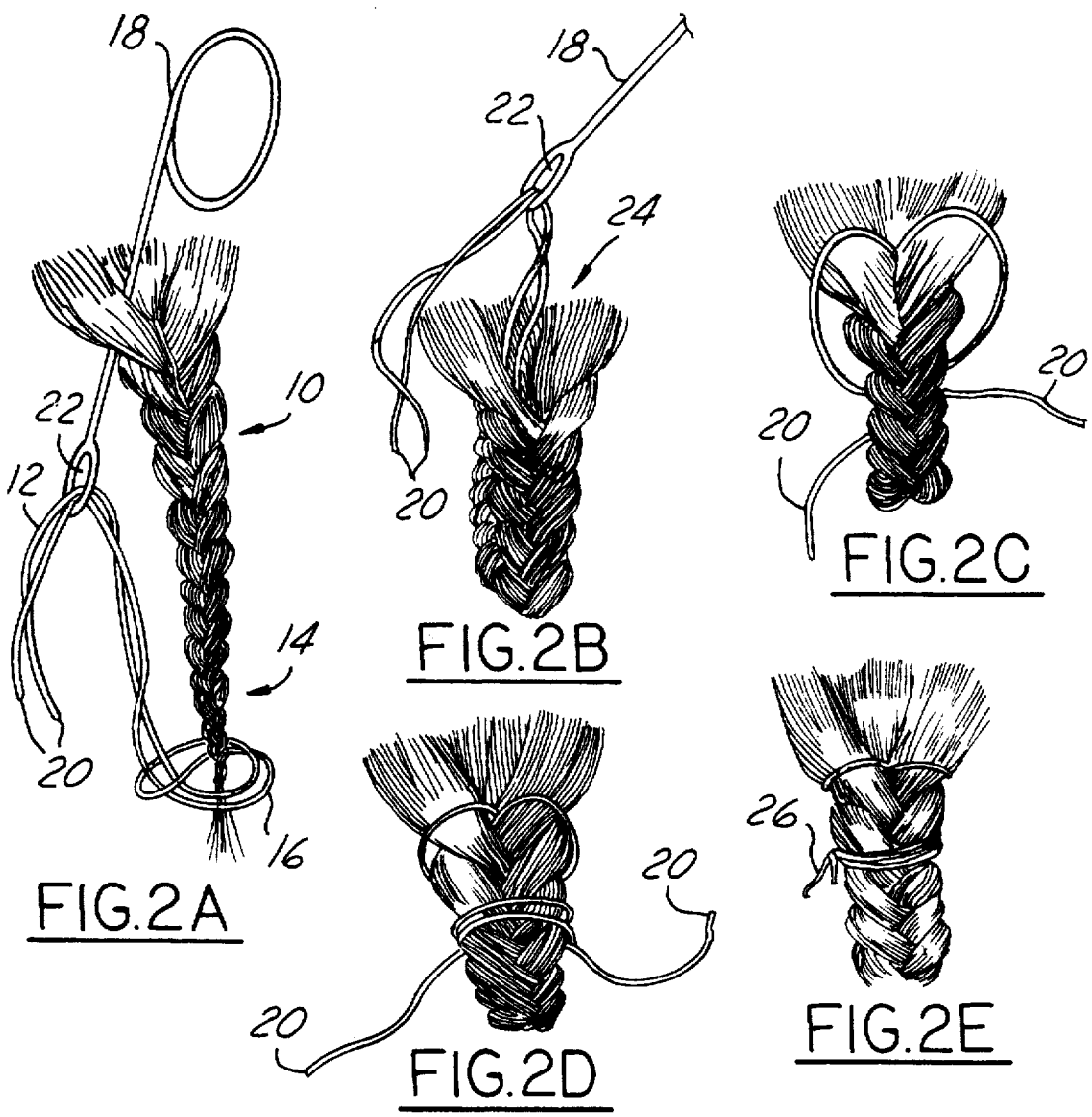
FIG. 2-A is an illustration of a horse mane braid with a needle inserted through the mane and threaded with yarn for securing the braid in accordance with a preferred embodiment of the present invention.

FIGS. 2-A through 2-E generally illustrate the steps by which a portion of horse mane is braided and then secured by the use of a piece of yarn. As shown in FIG. 2A a portion of horse mane, referred to generally by reference number 10, is braided in a known manner. In order to secure the braid 10, a piece of yarn 12 is formed into a loop and placed around the bottom portion 14 of the braid 10 to form a first knot 16. As used herein, the term yarn means any commercially available means that will accomplish the task of securing the braid.

A needle 18 is then threaded through the braid 10 and the ends 20 of the piece of yarn 12 are fed through the eye 22 of the needle 18. The needle 18 is then pulled through the braid 10 such that the ends 20 of the piece of yarn 12 are pulled through the top portion 24 of the braid 10, as shown in FIG. 2-B.

As shown in sequence in FIGS. 2-C through 2-E, the ends 20 of the piece of yarn 12 are wrapped around the braid 10 and then tied into a second knot 26 to secure the braid 10. In the preferred embodiment, the braid is formed by tieing the yarn into a square knot although any other suitable knot can be used to secure the braid.

Turning now to FIG. 3, a horse mane unbraiding tool 30 is shown. The tool 30 is used to more efficiently cut the yarn securing the braids and thus allow for the removal of the braids. The tool 30 includes a handle 32 where the groomer or other person caring for the horse can grasp the tool to cut the yarn. The handle 32 is preferably of a large enough size to allow a user to grasp the tool 30 and is preferably manufactured from an aluminum alloy with a plastic dip to prevent rusting. The handle 32 can alternatively be made of plastic, wood or any other equivalent material. For increased ability to grip the handle, the outer surface of the handle can be roughened or knurled. In addition, finger ridges (not shown) can be provided for ease of gripping and handling of the tool.

The tool 30 has a shank 34 that extends directly from the handle 32 and extends along the same plane. The shank 34 terminates in a hook-shaped portion 36. The hook-shaped portion 36 preferably terminates in a dull point 38 that extends directly towards the handle 32 in a plane parallel to the shank 34. The point 38 allows the hook-shaped portion 36 to fit more easily between and separate the yarn 12 from the horse mane. The point 38 is preferably rounded-off slightly to prevent accidently injuring the user.

The hook-shaped portion 36 includes an inner surface 40 and an outer surface 42. The inner surface 40 is machined to form a blade 44. The blade 44 is formed by narrowing the inner surface 40 into two planar surfaces 46 and 48 such that a narrow ridge 50 is formed providing the blade with a sharp cutting surface, as shown in FIG. 4.

The shank 34 and the blade 44 are preferably made of a 44C High Carbon Steel. However, the tool 30 can alternatively be manufactured from various other materials, the selection of the material is a matter of design choice based on the cost of production and other factors. Additionally, the blade 44 can be easily sharpened with a small ceramic knife sharpener or a chain saw blade sharpener.

FIGS. 5 and 6 illustrate the use of the tool 30 to cut the first and second yarn knots 16 and 26 that secure the braid and allow the horse mane to return to its normal position.

First, in order to cut either knot, the point 38 of the tool 30 is wedged between the braided horse mane 10 and the yarn 12 and the hookshaped portion 36 is positioned between the yarn 12 and the braid 10. In this position the inner surface 40 and thus the sharpened blade 44 are in contact with the yarn 12, and the smooth outer surface 42 is in contact with the horse mane.

As shown in FIG. 5, the tool is positioned to cut the knot 26. In order to cut the knot 26, the user need only pull the handle 32 in a generally downward direction, i.e. toward the ground. This is unlike prior tools, where in order to cut the braid, the user would have to push on the knot in order to cut it. The pulling motion is easier and more effective than prior tools that required a pushing motion to cut the yarn because of the necessary leverage a pushing motion requires to cut the knot. Additionally, because of the configuration of the tool, the hook-shaped portion 36 is able to more efficiently separate the yarn 12 from the braid 10 and prevent damage to the horse mane during the unbraiding process.

Once the knot 26 has been cut, the braid 10 will fall to an extended position, as shown in FIG. 6. In this position, the braid is only secured by knot 16. In order to cut the knot 16, the tool 30 is positioned between the yarn 12 and the mane 10 in the same manner described above. The tool 30 is again pulled in a downward motion—toward the ground—to cut the yarn. The yarn can then be removed by letting it fall out or by manually removing it from the horse's mane.

While only one preferred embodiment of the invention has been described hereinabove, those of ordinary skill in the art will recognize that this embodiment may be modified and altered without departing from the central spirit and scope of the invention. Thus, the embodiment described hereinabove is to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. An improved method for removing braids from a horse's mane comprising the steps of:

providing a braided horse mane with each braid being secured by a piece of yarn that is tied into a first knot and a second knot;

providing a tool with a sharpened edge for cutting said knots that are used to secure said braids, said tool having a handle member and an elongated shank member with a hooked end, the hooked end having a sharpened blade on the inner surface thereof;

hooking said hooked end of said tool around said first knot such that said sharpened blade is facing said yarn of said first knot;

pulling said tool in downward motion to cut said first knot;

placing said tool around said second knot such that said sharpened blade is facing said yarn of said second knot; and pulling said tool in a downward motion to cut said second knot.

* * * * *